US012266942B1

United States Patent
Li et al.

(10) Patent No.: US 12,266,942 B1
(45) Date of Patent: Apr. 1, 2025

(54) FAST-RESPONSE PV SIMULATOR BASED ON IMPROVED DEADBEAT PREDICTIVE CURRENT CONTROL

(71) Applicants: SHANDONG UNIVERSITY, Jinan (CN); SHANDONG JIAOTONG UNIVERSITY, Jinan (CN); SHANDONG BEIXINGQUAN ENERGY CO., LTD., Jinan (CN); IMPERIAL COLLEGE LONDON, London (GB)

(72) Inventors: Kejun Li, Jinan (CN); Zhijie Liu, Jinan (CN); Yuanzong Song, Jinan (CN); Zhenshan Huang, Jinan (CN); Yuchuan Li, London (GB); Gang Shen, Jinan (CN); Yuanyuan Sun, Jinan (CN); Kaiqi Sun, Jinan (CN); Jie Lou, Jinan (CN); Liang Zhang, Jinan (CN); Kehan Zhang, Jinan (CN)

(73) Assignees: SHANDONG UNIVERSITY, Jinan (CN); SHANDONG JIAOTONG UNIVERSITY, Jinan (CN); SHANDONG BEIXINGQUAN ENERGY CO., LTD., Jinan (CN); IMPERIAL COLLEGE LONDON, London (GB)

( * ) Notice: Subject to any disclaimer, the term of this patent is extended or adjusted under 35 U.S.C. 154(b) by 0 days.

(21) Appl. No.: 18/947,049

(22) Filed: Nov. 14, 2024

(30) Foreign Application Priority Data

Nov. 27, 2023 (CN) .......................... 202311593523.7

(51) Int. Cl.
*H02J 3/38* (2006.01)
*H02P 21/22* (2016.01)
(Continued)

(52) U.S. Cl.
CPC .............. *H02J 3/381* (2013.01); *H02P 21/22* (2016.02); *H02S 40/32* (2014.12); *H02S 50/10* (2014.12); *H02J 2300/26* (2020.01)

(58) Field of Classification Search
CPC .......... H02J 3/381; H02J 3/38; H02J 2300/26; H02S 40/32; H02S 50/10; H02P 21/22
See application file for complete search history.

(56) References Cited

U.S. PATENT DOCUMENTS

| 2022/0302859 A1 | 9/2022 | Rizo Morente et al. |
| 2023/0188066 A1 | 6/2023 | Kock et al. |

FOREIGN PATENT DOCUMENTS

| CN | 102097823 A | 6/2011 |
| CN | 109638887 A | 4/2019 |

(Continued)

OTHER PUBLICATIONS

Zhenwei Song et al. Robust Predictive Control Method and Stability Analysis for PV Grid-Connected VSI Power Electronics Technology, vol. 50, Issue 6, 23-25,54 Publication Date:Jun. 20, 2016.

(Continued)

*Primary Examiner* — Robert L Deberadinis
(74) *Attorney, Agent, or Firm* — CBM PATENT CONSULTING, LLC (57) ABSTRACT

A fast-response photovoltaic (PV) simulator based on an improved deadbeat predictive current control (DPCC). Compared to actual PV modules, there is a response time at the output of the PV simulation. Currently widely used PV simulation have a long response time, which cannot meet the performance testing requirements of high-performance grid-connected PV inverters. Based on the energy balance of the inductor during the absorption and dissipation phases, the current control law of the output inductor in the PV simulation was studied in a single switching period, thereby establishing the required DPCC model. An integral com- (Continued)

pensation eliminates the steady-state error in current tracking caused by nonlinear factors such as time delay and mismatched parameters, enabling its wide application in engineering. For the proposed PV simulator, the transient response time can be reduced to 1.1 ms and significantly shorter than widely used PV simulation.

2 Claims, 6 Drawing Sheets

(51) Int. Cl.
*H02S 40/32* (2014.01)
*H02S 50/10* (2014.01)

(56) References Cited

FOREIGN PATENT DOCUMENTS

| | | |
|---|---|---|
| CN | 116087596 A | 5/2023 |
| WO | 2021017237 A1 | 9/2022 |

OTHER PUBLICATIONS

Guifeng Wang et al. A Deadbeat UPQC Predictive Direct Control Strategy Power Grid and Clean Energy, vol. 39, Issue 11, 40-49 Publication Date:Nov. 25, 2023.
Benfei Wang et al. Deadbeat Control for Hybrid Energy Storage Systems in DC Microgrids IEEE Transactions on Sustainable Energy, vol. 10, Issue 4, 1867-1877 Publication Date:Oct. 4, 2018.

FAST-RESPONSE PV SIMULATOR BASED ON IMPROVED DEADBEAT PREDICTIVE CURRENT CONTROL

CROSS-REFERENCE TO RELATED APPLICATIONS

This application claims priority to Chinese Patent Application Ser. No. CN2023115935237 filed on 27 Nov. 2023.

FIELD OF THE INVENTION

The present invention relates to a fast-response PV simulator based on an improved deadbeat predictive current control (DPCC), belongs to the field of analysis and control technology for grid-connected converters. of renewable energy source.

BACKGROUND OF THE INVENTION

PV power generation, a technology that directly converts solar energy into electricity, has been widely adopted worldwide as a clean energy source. However, in the study of maximum power point tracking algorithms and control strategies for PV power systems, it is not possible to arbitrarily adjust the weather and load using actual PV modules to change their output power. PV simulation offers arbitrary adjustability and cost-effectiveness, making it widely used in research and engineering debugging. Since the PV simulation serves as a power source in experimental testing of PV power systems, its output response time inevitably affects the validity and reliability of the test results.

To minimize the impact of PV simulation on the testing of PV power systems, the response time at their output should be as close as possible to actual PV modules. However, the response time of existing PV simulation is several times compares to PV modules and PV simulation causing interference and limitations in the testing of PV power systems.

SUMMARY OF THE INVENTION

To address the above-mentioned problems, the present invention relates to a fast-response PV simulator based on an improved DPCC that significantly reduce its response time and restore the transient characteristics of real PV modules.

The technical solution of the present invention is as follows:

A fast-response PV simulator based on an improved DPCC which comprising at least one processor and at least one computer-readable storage medium having stored thereon instruction which, when executed, program the at least one processor to perform the calculations, it includes a reference value calculation module, a DPCC controller and a modulation control module, wherein the reference value calculation module is implemented through a PV array model, The PV array model collects the output voltage $U_{pv}$ in real time, and combines with the set voltage of maximum power point $U_m$, the set current of maximum power point $I_m$, short-circuit current $I_{sc}$, and open-circuit voltage $U_{oc}$ to calculate the reference value of the output current $I_{ref}$.

The DPCC controller receives the calculated reference current value and derives the deadbeat control law for the inductor current by formulating the discrete model of the power electronic converter. It inputs the collected direct current bus voltage $U_{dc}$, output voltage $U_{pv}$, the current inductor current $I_{L,n}|_{d_{n-1}}$, inductor value L, the previous moment's duty cycle $d_{n-1}$, and the reference current value $I_{ref}$ into DPCC controller to obtain the reference value of duty cycle for the next moment $d_n$;

The calculated reference duty cycle value $d_n$ is automatically updated at the start of the next moment. The modulation control module obtains the triggering signals for the Insulated Gate Bipolar Transistor (IGBT) through the modulation sector. After passing through the drive circuit, it performs real-time control of the IGBT, enabling the output current of the fast-response PV simulation to track its reference value.

Preferably, in order to eliminate the steady-state error of the DPCC controller, an integral compensation sector is introduced to correct the current reference value as the input to the current reference value of DPCC controller. Specifically, the difference between the current reference value $I_{ref}$ calculated by the PV array model and the feedback value $I_{L,n}|_{d_{n-1}}$ is used as the input to the integral compensation sector. The output from the integral compensation sector is then added to the current reference value to serve as the corrected reference value for DPCC controller, thereby achieving zero steady-state error tracking of the output current.

Preferably, the implementation steps of the DPCC controller are as follows:

Equivalent DC-DC Topology of the Fast Response PV Simulation

Figure 2:
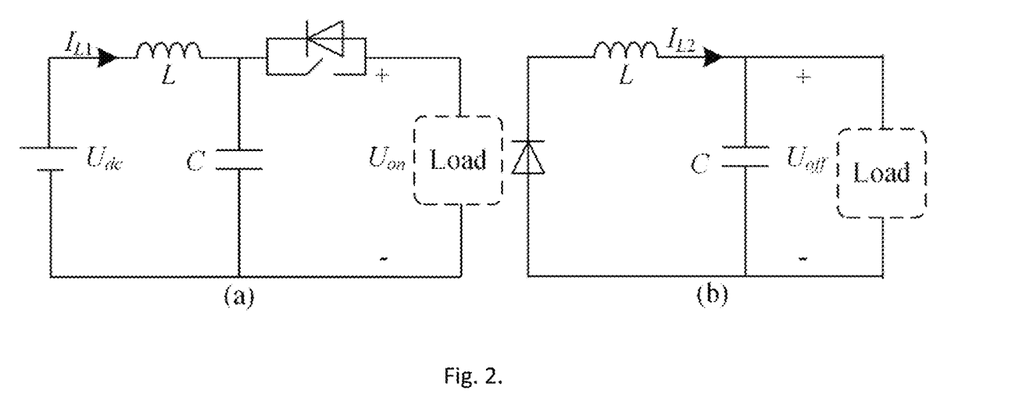
FIG. 2. DC-DC topology of fast response photovoltaic simulation.

The DC-DC topology of the fast-response PV simulator can be equivalent to a buck converter for analysis, which is shown in FIG. 2. When the DPCC strategy is used in the DC-DC converter, the inductor current must be accurately modeled to obtain the correct predicted value of the control variable.

When the switch tube is on, the expression of the inductor current is as follows:

$$L\frac{dI_{L1}}{dt} + U_{on} = U_{dc} \tag{1}$$

where L is the inductance value of the buck converter, $I_{L1}$ is the value of the inductor current, $U_{on}$ is the output voltage of the buck converter, and $U_{dc}$ is the input voltage;

When the switch tube is off, the expression of the inductor current is as follows:

$$L\frac{dI_{L2}}{dt} + U_{off} = 0 \tag{2}$$

where $U_{off}$ is the output voltage of the buck converter, and $I_{L2}$ is the value of the inductor current;

When the buck converter works in a steady state, the energy of the inductor is balanced between absorption and dissipation during a single switching period. Due to the short duration of a single switching period, the output voltage is considered constant during this interval. Therefore, the output voltage of the switch tube does not change in a single switching period, as follows:

$$U_{on} = U_{off} \tag{3}$$

Accurate Modeling of Inductor Current in Fast Response PV Simulation

Figure 3:
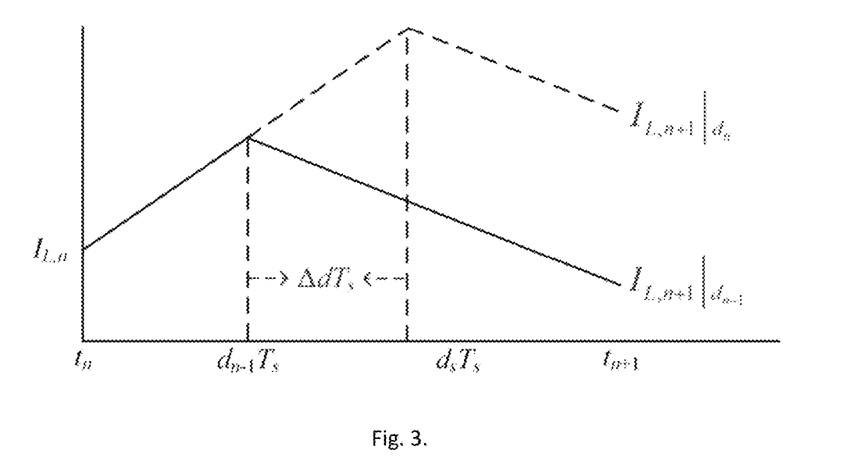
FIG. 3. Inductor current in a single switching period.

Assume that the value of the inductor current at time $t_n$ is $I_{L,n}$. If the duty ratio at time $t_n$ is the same as that at time $t_{n-1}$, then, at time $t_{n+1}$, the calculation expression for the value of the inductor current is as follows:

$$I_{L,n+1}|_{d_{n-1}} = I_{L,n} + d_{n-1}T_s\frac{U_{dc} - U_{on}}{L} - (1-d_{n-1})T_s\frac{U_{off}}{L} \quad (4)$$

where $d_{n-1}$ is the duty ratio at time $t_{n-1}$, $I_{L,n+1}|_{d_{n-1}}$ is the value of the inductor current at time $t_{n+1}$ when the duty ratio is $d_{n-1}$, and $T_s$ is the switching period of the buck converter;

When the duty ratio changes to $d_n$ at time $t_n$, the value of the inductor current at time $t_{n+1}$ is expressed as $I_{L,n+1}|_{d_n}$. The above process can be shown in FIG. 3.

Control law of DPCC

The relationship between $I_{L,n+1}|_{d_n}$ and $I_{L,n+1}|_{d_{n-1}}$ is as follows:

$$I_{L,n+1}|_{d_n} - I_{L,n+1}|_{d_{n-1}} = (d_n - d_{n-1})T_s\frac{U_{dc}}{L} \quad (5)$$

Equation (5) shows that if the duty ratio changes from $d_{n-1}$ to $d_n$ at time $t_n$, then, at time $t_{n+1}$, the value of the inductor current will change to $I_{L,n+1}|_{d_n}$. Consequently, if the reference value of the inductor current is equal to $I_{L,n+1}|_{d_n}$, the DPCC of the inductor current can be realized. Therefore, the DPCC law for the DC-DC topology of the fast-response PV simulator can be presented as follows:

$$I_{L,n+1}|_{ref} - I_{L,n+1}|_{d_{n-1}} = (d_n - d_{n-1})T_s\frac{U_{dc}}{L} \quad (6)$$

where $I_{L,n+1}|_{ref}$ is the reference value of the inductor current at time $t_{n+1}$.

For any details not elaborated in this invention, reference can be made to existing technology.

The beneficial effects of the present invention are:

A fast-response PV simulator based on an improved DPCC is proposed in this invention. Based on the energy balance of the inductor during the absorption and dissipation phases, the current control law of the output inductor in the PV simulation was studied, thereby establishing the required DPCC model. An integral compensation eliminates the steady-state error in current tracking caused by nonlinear factors such as time delay and mismatched parameters, enabling its wide application in engineering. For the proposed PV simulator, the transient response time can be reduced to 1.1 ms and significantly shorter than traditional PV simulation, It can maximally restore the transient characteristics of real PV modules, reducing the interference of this response time on the performance testing of PV grid-connected inverters.

BRIEF DESCRIPTION OF THE DRAWINGS

The figures that form part of this application are provided to offer further understanding of the application. The illustrative embodiments and their descriptions in this application are intended to explain the application and do not constitute an improper limitation thereof.

DETAILED DESCRIPTION OF THE INVENTION

In order to provide a better understanding of the technical solutions in this specification for those skilled in the art, the following provides a clear and complete description of the technical solutions in the embodiment of the present invention in conjunction with the accompanying drawings. However, it is not limited to this; any aspects not thoroughly described in this invention are to be understood according to conventional techniques in the relevant field.

Embodiment 1

Figure 1:
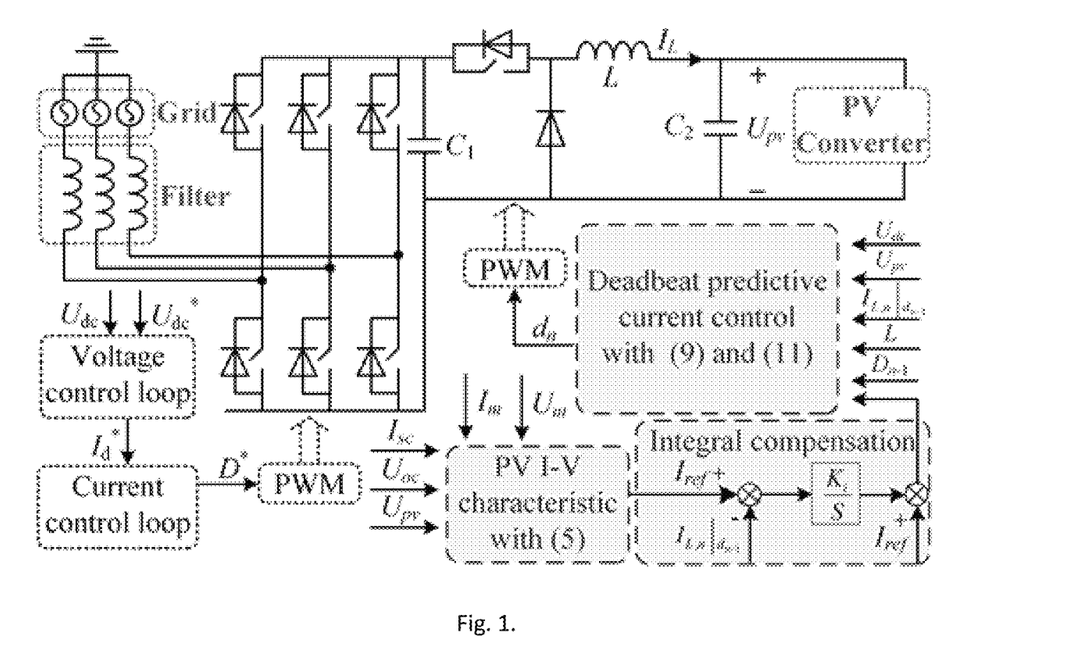
FIG. 1. Control strategy block of the proposed PV simulator.

A fast-response PV simulator based on an improved DPCC which comprising at least one processor and at least one computer-readable storage medium having stored thereon instruction which, when executed, program the at least one processor to perform the calculations, it includes a reference value calculation module, a DPCC controller and a modulation control module, The overall block of control strategy is shown in FIG. 1. The topology in FIG. 1. is mainly divided into two stages: AC-DC rectifier and DC-DC converter. For the AC-DC rectifier, a dual-loop control strategy in the dq coordinate system is used to control the three-phase rectifier. The outer loop is a voltage control with a set reference value for the DC bus voltage $U_{dcref}$, ensuring that the actual value of the DC bus voltage $U_{dc}$ tracks its reference value, thereby maintaining a constant DC bus voltage. The inner loop is a dq-axis current control. The voltage loop generates the inner loop d-axis current reference value $I_{dref}$ through PI control. The current inner loop produces the modulation reference signal Dref for the three-phase rectifier, ultimately achieving stabilize value of bus voltage $U_{dc}$ and real-time power track. By controlling the output current reference value $I_{ref}$ of the downstream DC-DC converter, it can simulate the PV output characteristics.

First, a mathematical model of PV array is established to obtain the mathematical relationship between its output voltage $U_{pv}$ and reference value of output current $I_{ref}$.

The reference value calculation module is implemented through the PV array, which collects the output voltage $U_{pv}$ in real time, by combining with the set voltage of maximum power point $U_m$, the set current of maximum power point $I_m$, short-circuit current $I_{sc}$ and open-circuit voltage $U_{oc}$, the output current reference value $I_{ref}$ is calculated;

The DPCC controller receives the calculated reference current value and derives the deadbeat control law for the inductor current by formulating the discrete model of the power electronic converter. It inputs the collected direct current bus voltage $U_{dc}$, output voltage $U_{pv}$, the current inductor current $I_{L,n+1}|_{d_{n-1}}$, inductor value L, the previous moment's duty cycle $d_{n-1}$, and the reference current value $I_{ref}$ into DPCC controller to obtain the reference value of duty cycle for the next moment $d_n$;

The calculated reference duty cycle value $d_n$ is automatically updated at the start of the next moment. The modulation control module obtains the triggering signal for the Insulated Gate Bipolar Transistor (IGBT) through the modulation process. After passing through the drive circuit, it performs real-time control of the IGBT, enabling the output current of the fast-response PV simulation to track its reference value.

Embodiment 2

A fast-response PV simulator based on an improved DPCC which comprising at least one processor and at least one computer-readable storage medium having stored thereon instruction which, when executed, program the at least one processor to perform the calculations, as described in Embodiment 1. The difference is that in order to eliminate the steady-state error of the DPCC controller, an integral compensation sector is introduced to correct the current reference value as the input to the current reference value of DPCC controller. Specifically, the difference between the current reference value $I_{ref}$ calculated by the PV array and the feedback $I_{L,n+1}|_{d_{n+1}}$ is used as the input to the integral compensation sector. The output from the integral compensation sector is then added to the current reference value to serve as the corrected reference value for DPCC controller, thereby achieving zero steady-state error tracking of the output current.

Embodiment 3

A fast-response PV simulator based on an improved DPCC which comprising at least one processor and at least one computer-readable storage medium having stored thereon instruction which, when executed, program the at least one processor to perform the calculations, as described in Embodiment 2. The difference is that the implementation steps of the DPCC controller are as follows:

(1) Equivalent DC-DC Topology of the Fast Response PV Simulation

The DC-DC topology of the fast-response PV simulator can be equivalent to a buck converter for analysis, which is shown in FIG. 2. When the DPCC strategy is used in the DC-DC converter, the inductor current must be accurately modeled to obtain the correct predicted value of the control variable.

When the switch tube is on, the expression of the inductor current is as follows:

$$L\frac{dI_{L1}}{dt} + U_{on} = U_{dc} \quad (1)$$

where L is the inductance value of the buck converter, $I_{L1}$ is the value of the inductor current, $U_{on}$ is the output voltage of the buck converter, and $U_{dc}$ is the input voltage;

When the switch tube is off, the expression of the inductor current is as follows:

$$L\frac{dI_{L2}}{dt} + U_{off} = 0 \quad (2)$$

where $U_{off}$ is the output voltage of the buck converter, and $I_{L2}$ is the value of the inductor current;

When the buck converter works in a steady state, the energy of the inductor is balanced between absorption and dissipation during a single switching period. Due to the short duration of a single switching period, the output voltage is considered constant during this interval. Therefore, the output voltage of the switch tube does not change in a single switching period, as follows:

$$U_{on} = U_{off} \quad (3)$$

(2) Accurate Modeling of Inductor Current in Fast Response PV Simulation

Assume that the value of the inductor current at time $t_n$ is $I_{L,n}$. If the duty ratio at time $t_n$ is the same as that at time $t_{n-1}$, then, at time $t_{n+1}$, the calculation expression for the value of the inductor current is as follows:

$$I_{L,n+1}|_{d_{n-1}} = I_{L,n} + d_{n-1}T_s\frac{U_{dc} - U_{on}}{L} - (1 - d_{n-1})T_s\frac{U_{off}}{L} \quad (4)$$

where $d_{n-1}$ is the duty ratio at time $t_{n-1}$, $I_{L,n+1}|_{d_{n-1}}$ is the value of the inductor current at time $t_{n+1}$ when the duty ratio is $d_{n-1}$, and $T_s$ is the switching period of the buck converter;

When the duty ratio changes to $d_n$ at time $t_n$, the value of the inductor current at time $t_{n+1}$ is expressed as $I_{L,n+1}|_{d_n}$. The above process can be shown in FIG. 3.

(3) Control Law of DPCC the relationship between $I_{L,n+1}|_{d_n}$ and $I_{L,n+1}|_{d_{n-1}}$ is as follows:

$$I_{L,n+1}|_{d_n} - I_{L,n+1}|_{d_{n-1}} = (d_n - d_{n-1})T_s\frac{U_{dc}}{L} \quad (5)$$

Equation (5) shows that if the duty ratio changes from $d_{n-1}$ to $d_n$ at time $t_n$, then, at time $t_{n+1}$, the value of the inductor current will change to $I_{L,n+1}|_{d_n}$. Consequently, if the reference value of the inductor current is equal to $I_{L,n+1}|_{d_n}$, the DPCC of the inductor current can be realized. Therefore, the DPCC law for the DC-DC topology of the fast-response PV simulator can be presented as follows:

$$I_{L,n+1}|_{ref} - I_{L,n+1}|_{d_{n-1}} = (d_n - d_{n-1})T_s\frac{U_{dc}}{L} \quad (6)$$

where $I_{L,n+1}|_{ref}$ is the reference value of the inductor current at time $t_{n+1}$, In actual control systems, the duty cycle calculated at the current time will only be updated in the next time step. This implies that there is a one-step delay in the control. In addition, as the operating time of the control system increases, variations in the main circuit parameters of the system, the conduction voltage drop of the IGBT, and various other nonlinear factors can introduce steady-state tracking errors in predictive control. Therefore, the present invention proposes an integral compensation method that meets the rapidity requirements of the PV simulation while eliminating steady-state errors caused by various nonlinear factors.

Figure 4:
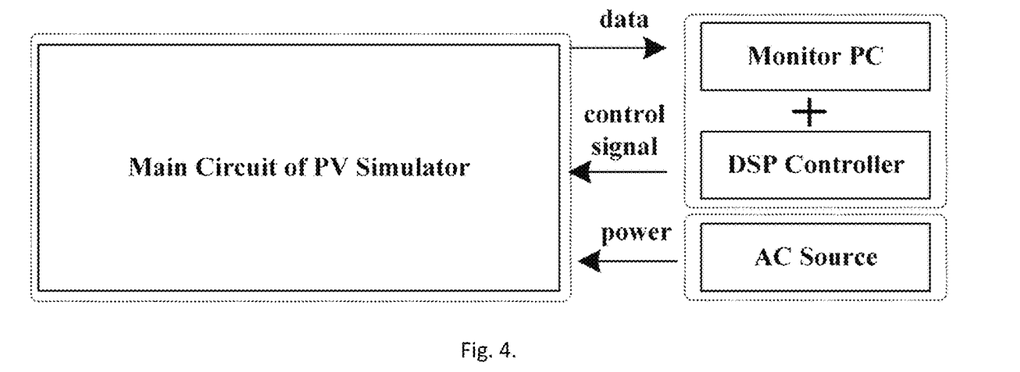
FIG. 4. Hardware prototype of the fast-response PV simulator.

In order to verify the effectiveness of the fast response PV simulation proposed in this invention, a hardware prototype was built for experimental validation as shown in FIG. 4. Its system parameters are given in Table I.

TABLE I

PARAMETERS OF THE PV SIMULATOR TEST PLATFORM

| Itrems | Values |
|---|---|
| Fundamental frequency $f$ | 50 Hz |
| Rated line voltage (rms) | 10 V |
| DC-side voltage $U_{dc}$ | 80 V |
| Arm inductor $L_d$ | 3 mH |
| Inductor L | 2 mH |
| DC bus capacitance $C_1$ | 2000 uF |
| Output capacitance $C_2$ | 100 uF |

The transient response time of three simulators is compared and analyzed: the PV simulator based on proportional-integral (PI) controller, the commercial PV simulator ITECH IT6018C-1500-40, and the fast-response PV simulator. Tow experimental cases are carried out to compare and analyze the transient response capability of the proposed PV simulator.

Figure 5:
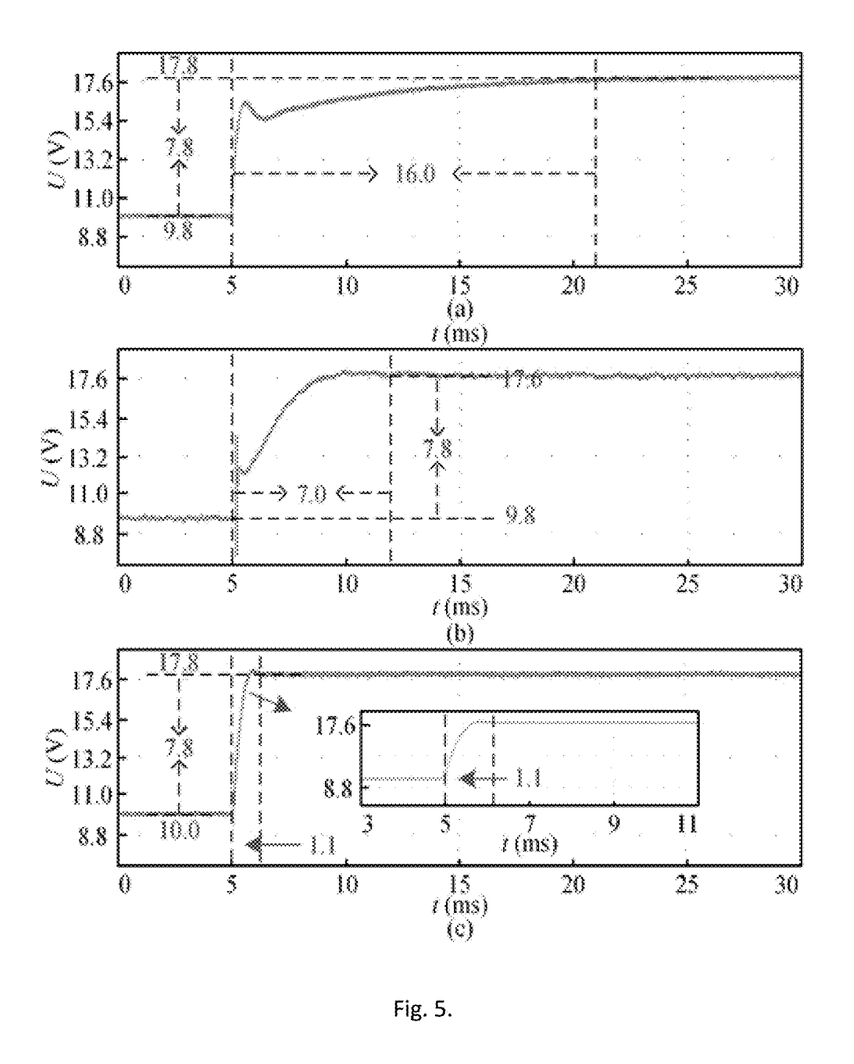
FIG. 5. Case I: transient response time of three cases of PV simulators in voltage step-up experiments: (a) Response Time of PI-based PV simulator (b) Response Time of the commercial PV simulator ITECH IT6018C-1500-40 (c) Response Time of the proposed fast-response PV simulator.

Case I is a response time test of different PV simulation during a voltage step increase as shown in FIG. 5. In case I, output voltages of three different PV simulators all start to step at 5 ms. The value of the step-up voltage is 7.8 V. In FIG. 5 (*a*), the output voltage of the PI-based PV simulator has a larger rise, which then decreases slightly and slowly tracks its reference value. The entire response process lasted 16 ms. In FIG. 5 (*b*), the output voltage of the commercial PV simulator ITECH IT6018C-1500-40 has a small sudden rise, which is controlled to a steady state after 7 ms. In FIG. 5 (*c*), the output voltage of the proposed fast-response PV simulator rises rapidly to near the reference value with a small overshoot. Due to its short transient response time, a local amplified experimental waveform with a time scale of 2 ms/div is presented. The results show that the fast-response PV simulator starts to step at 5 ms, which only takes 1.1 ms to reach the steady state. The transient response time is significantly shorter than that of the two previously tested PV simulation.

Figure 6:
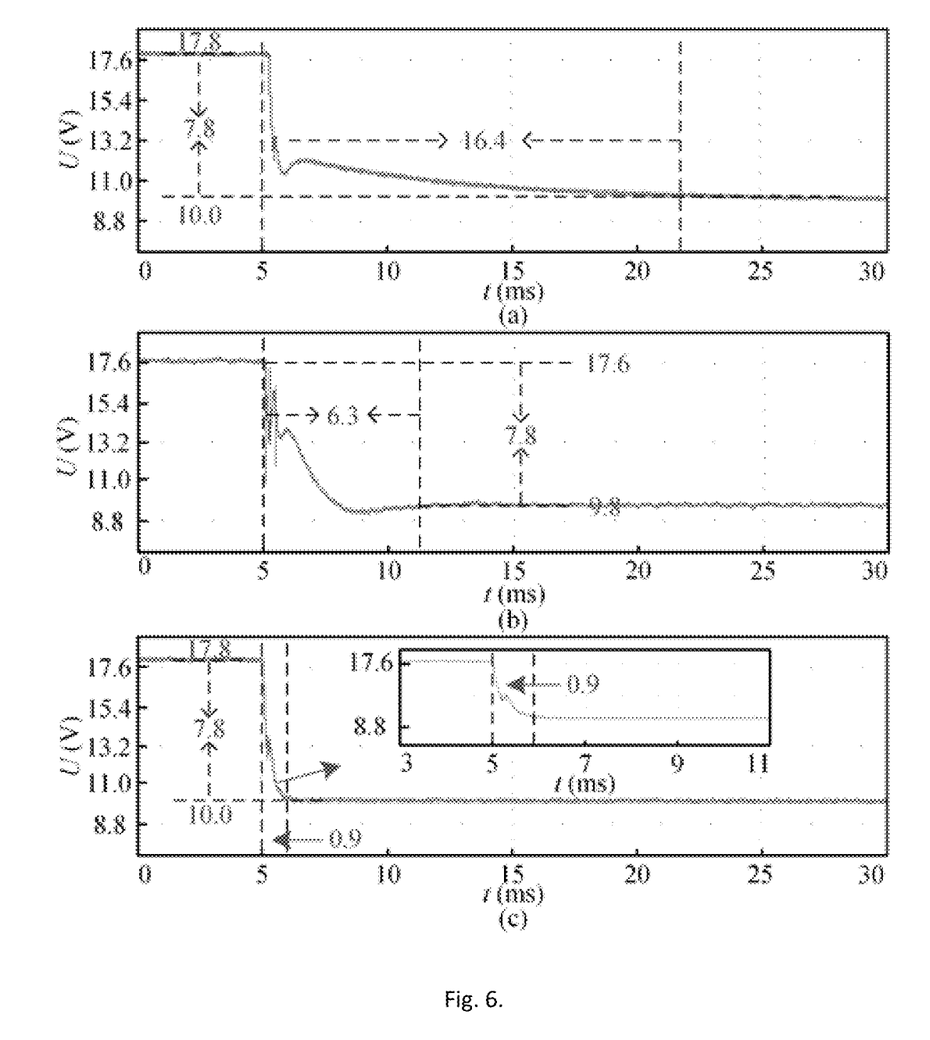
FIG. 6. Case II: transient response time of three cases of PV simulators in voltage step-down experiments: (a) Response Time of the PI-based PV simulator (b) Response Time of the commercial PV simulator ITECH IT6018C-1500-40 (c) Response Time of the proposed fast-response PV simulator.

Case II is a response time test of different PV simulation during a voltage step decrease as shown in FIG. 6. In case II, the start time and value of the voltage step are the same as in case I. In FIG. 6 (*a*), the output voltage of the PI-based PV simulator reaches a steady state after about 16.4 ms. In FIG. 6 (*b*), the output voltage of the commercial PV simulator reaches the steady state after 7 ms. In FIG. 6 (*c*), the output voltage of the proposed fast-response PV simulator drops rapidly to near the reference value. In order to better observe its transient response time, the time scale of the oscilloscope is reduced to 2 ms/div. The experimental results show that the proposed PV simulator starts to step at 5 ms, which takes only 0.9 ms to reach the steady state.

The experimental results in FIGS. 5 and 6 show that the voltage transient response speed of the proposed fast-response PV simulator is about 6 times faster than that of the commercial PV simulator ITECH IT6018C-1500-40. The transient response time of the proposed PV simulator is much shorter than that of the previous two PV simulators.

The invention patent proposes a fast-response PV simulator that can be used for MPPT testing of high-performance photovoltaic inverters. When the MPPT tracking time of the PV inverter is as low as 1 ms, it can still meet the tracking requirements.

Figure 7:
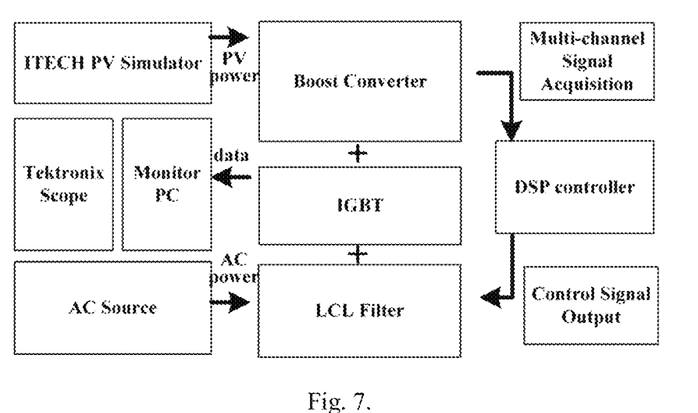
FIG. 7. Hardware prototype of the PV simulator test platform.
Figure 8:
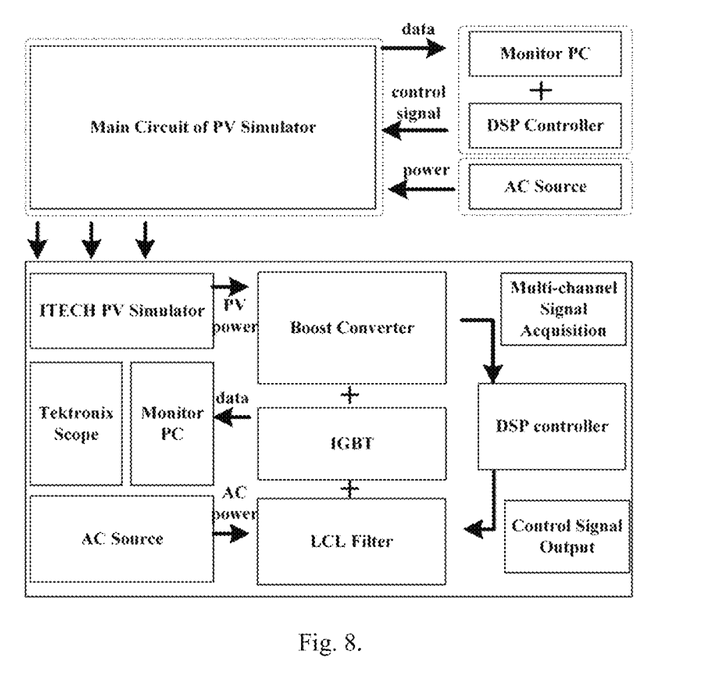
FIG. 8. Fast-response PV simulator test platform.

In order to further prove the fast response and strong robustness of the fast-response PV simulator, a PV inverter is connected for experimental testing. The hardware prototype of the fast-response PV simulator in FIG. 4 is used to replace the commercial PV simulator ITECH IT6018C-1500-40 in FIG. 7. This process is shown in FIG. 8.

In order to prove that the fast-response PV simulator can keep its fast response when simulating changes in temperature and irradiance, its MPP current Im, short-circuit current Isc, MPP voltage Um, and open-circuit voltage Uoc are all changed. Among them, the Um is changed to 55 V.

The MPPT time of PV inverters needs to be greater than or equal to the response time of PV simulators. This analysis has been presented in Section III. The transient response time of the commercial PV simulator ITECH IT6018C-1500-40 is 7 ms. Therefore, its MPP cannot be tracked when the MPPT tracking time is 1 ms. The response time of the proposed fast-response PV simulator can be reduced to 1.1 ms, which has been verified with experimental results. Therefore, its MPP voltage Um can theoretically be tracked with an MPPT time of 1 ms. Three groups of experiments with different MPPT tracking times are tested and compared. The experimental results are shown in the following figure.

Figure 9:
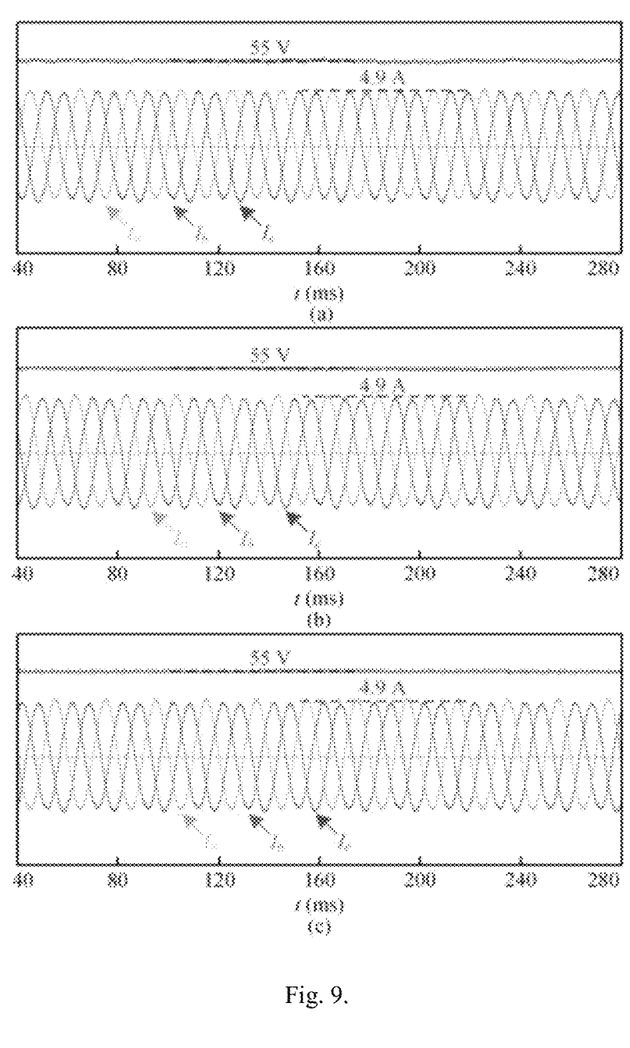
FIG. 9. Tracking performance of the PV inverter under different MPPT tracking times: (a) tmppt=1 ms (b) tmppt=7 ms (c) tmppt=50 ms.

In FIG. 9, when the MPPT tracking time is 1 ms, the MPP of the proposed fast-response PV simulator can still be tracked. The experimental results further prove that both fast response and strong robustness are realized in the proposed PV simulator, which can meet the test requirements with an MPPT tracking time of 1 ms. In addition, the analysis in Section III also can be further verified by the experimental results.

All the above experimental results show that fast response and strong robustness are realized in the proposed fast-response PV simulator.

The application of PV simulation devices is mostly in the field of solar PV power generation, especially in scenarios where high-power tests are conducted on power inverters of PV power generation systems. PV simulation devices can replicate various working conditions such as different solar radiation levels, temperatures, shading, loads, and generate current-voltage characteristic curves and power output curves similar to those of actual PV power generation systems. In engineering, the response time of PV simulation devices as test power sources affects the reliability of test results. The fast response PV simulation device's output response time is close to that of real PV components, minimizing interference and limitations on testing PV power systems to the greatest extent possible. For example, in testing household solar energy storage microgrids, the fast-response PV simulation device to achieve rapid MPPT for PV inverters provides support for the reliability of test results.

A household solar energy storage and charging microgrid system integrates PV generation, energy storage, and charging. It utilizes solar power generation, energy storage batteries, and new energy vehicle battery packs as energy storage tools to meet the electricity needs of a household. When testing the performance of household solar energy storage, ensuring the speed of the PV simulator and the fidelity of replicating the real characteristics of PV components are crucial. In the PV inverter, the PV simulator is replaced with the fast response PV simulator, device to act as the PV source. The fast response PV simulator greatly enhances the voltage transient response speed, enabling the MPPT time of the PV inverter to be reduced to as low as 1 ms while still meeting the tracking requirements. This provides more precise PV variables for testing the solar energy storage system ensures the adjustability of power sources and cost effectiveness, reduces response time to enhance the effectiveness and reliability of test results.

The above describes the preferred embodiment of the present invention. It should be noted that ordinary technicians in this technical field can make several improvements and modifications without departing from the principles described in the present invention, and these improvements and modifications should also be considered within the scope of protection of the present invention.

What is claimed is:

1. A fast-response PV simulator based on an improved deadbeat predictive current control (DPCC), comprising a reference value calculation module, a DPCC controller and a modulation control module, wherein the reference value calculation module is implemented through a PV array model, the PV array model collects the output voltage $U_{pv}$ in real time, and combines with the set voltage of maximum power point $U_m$, the set current of maximum power point $I_m$, short-circuit current $I_{sc}$, and open-circuit voltage $U_{oc}$ to calculate the reference value of the output current $I_{ref}$, the DPCC controller receives the calculated reference current value and derives the deadbeat control law for the inductor current by formulating the discrete model of the power electronic converter; it inputs the collected direct current bus voltage $U_{dc}$, output voltage $U_{pv}$, the current inductor current $I_{L,n+1}|_{d_{n+1}}$, inductor value L, the previous moment's duty cycle $d_{n-1}$ and the reference value of current $I_{ref}$ into DPCC controller to obtain the reference value of duty cycle for the next moment $d_n$;

the calculated reference value of duty cycle $d_n$ is automatically updated at the start of the next moment; the modulation control module obtains the triggering signals for the Insulated Gate Bipolar Transistor (IGBT) through the modulation sector; after passing through the drive circuit, it performs real-time control of the IGBT, enabling the output current of the fast-response PV simulation to track its reference value;

the implementation steps of the DPCC controller are as follows:

(1) equivalent DC-DC topology of the fast response PV simulation the DC-DC topology of the fast-response PV simulator can be equivalent to a buck converter for analysis; when the DPCC strategy is used in the DC-DC converter, the inductor current must be accurately modeled to obtain the correct predicted value of the control variable;

when the switch tube is on, the expression of the inductor current is as follows:

$$L\frac{dI_{L1}}{dt} + U_{on} = U_{dc} \tag{1}$$

where L is the inductance value of the buck converter, $I_{L1}$ is the value of the inductor current, $U_{on}$, is the output voltage of the buck converter, and $U_{dc}$ is the input voltage;

when the switch tube is off, the expression of the inductor current is as follows:

$$L\frac{dI_{L2}}{dt} + U_{off} = 0 \tag{2}$$

where $U_{off}$ is the output voltage of the buck converter, and $I_{L2}$ is the value of the inductor current;

when the buck converter works in a steady state, the energy of the inductor is balanced between absorption and dissipation during a single switching period. Due to the short duration of a single switching period, the output voltage is considered constant during this interval; therefore, the output voltage of the switch tube does not change in a single switching period, as follows:

$$U_{on} = U_{off} \tag{3}$$

(2) accurate modeling of inductor current in fast response PV simulation assume that the value of the inductor current at time $t_n$ is $I_{L,n}$; if the duty ratio at time $t_n$ is the same as that at time $t_{n-1}$, then, at time $t_{n+1}$, the calculation expression for the value of the inductor current is as follows:

$$I_{L,n+1}|_{d_{n-1}} = I_{L,n} + d_{n-1}T_s\frac{U_{dc} - U_{on}}{L} - (1 - d_{n-1})T_s\frac{U_{off}}{L} \tag{4}$$

where $d_{n-1}$ is the duty ratio at time $t_{n-1}$, $I_{L,n+1}|_{d_{n-1}}$ is the value of the inductor current at time $t_{n+1}$ when the duty ratio is $d_{n-1}$, and $T_s$ is the switching period of the buck converter;

when the duty ratio changes to $d_n$ at time $t_n$, the value of the inductor current at time $t_{n+1}$ is expressed as $I_{L,n+1}|_{d_n}$;

(3) control law of DPCC the relationship between $I_{L,n+1}|_{d_n}$ and $I_{L,n+1}|_{d_{n-1}}$ is as follows:

$$I_{L,n+1}|_{d_n} - I_{L,n+1}|_{d_{n-1}} = (d_n - d_{n-1})T_s\frac{U_{dc}}{L} \tag{5}$$

equation (5) shows that if the duty ratio changes from $d_{n-1}$ to $d_n$ at time $t_n$, then, at time $t_{n+1}$, the value of the inductor current will change to $I_{L,n+1}|_{d_n}$, consequently, if the reference value of the inductor current is equal to $I_{L,n+1}|_{d_n}$, the DPCC of the inductor current can be realized; therefore, the DPCC law for the DC-DC topology of the fast-response PV simulator can be presented as follows:

$$I_{L,n+1}|_{ref} - I_{L,n+1}|_{d_{n-1}} = (d_n - d_{n-1})T_s\frac{U_{dc}}{L} \tag{6}$$

where $I_{L,n+1}|_{ref}$ is the reference value of the inductor current at time $t_{n+1}$.

2. The fast-response PV simulator based the an improved deadbeat predictive current control (DPCC) according to claim 1, wherein, in order to eliminate the steady-state error of the DPCC controller, an integral compensation sector is introduced to correct the current reference value as the input to the current reference value of DPCC controller; specifically, the difference between the current reference value $I_{ref}$ calculated by the PV array model and the feedback value $I_{L,n+1}|_{d_{n+1}}$ is used as the input to the integral compensation sector; the output from the integral compensation sector is then added to the current reference value to serve as the corrected reference value for DPCC controller.

* * * * *